United States Patent [19]

Biancale et al.

[11] 4,400,115
[45] Aug. 23, 1983

[54] METHOD FOR DEPOSITING MATERIAL ON THE OCEAN BED AND APPARATUS FOR PERFORMING THE SAME

[75] Inventors: Pierre Biancale, Gif-sur-Yvette; Yves-Paul Corfa, Nantes; Pierre Lemercier, Grenoble, all of France; Jean-Pierre Moreau, De Panne, Belgium; Jean Vertut, Issy les Moulineaux, France

[73] Assignee: Commissariat a l'Energie Atomique, Paris, France

[21] Appl. No.: 379,144

[22] Filed: May 17, 1982

Related U.S. Application Data

[62] Division of Ser. No. 971,193, Dec. 20, 1978.

[51] Int. Cl.³ .............................................. F02D 15/10
[52] U.S. Cl. .................................. 405/303; 180/7 A; 180/167; 405/159; 405/172
[58] Field of Search ............... 405/154, 155, 158, 157, 405/168–172, 159; 299/1; 180/7 A, 167, 168; 114/40–42, 312

[56] References Cited

U.S. PATENT DOCUMENTS

| | | | |
|---|---|---|---|
| 2,842,039 | 7/1958 | Swingle | 180/168 X |
| 3,112,004 | 11/1963 | Neaville | 180/167 |
| 3,224,407 | 12/1965 | Bertrand | 180/7 A X |
| 3,267,682 | 8/1966 | Robley | 405/170 |
| 3,632,172 | 1/1972 | Robinson | 114/42 X |
| 3,688,510 | 9/1972 | Keating | 405/172 X |
| 3,706,284 | 12/1972 | Plasser et al. | 299/1 X |
| 3,812,929 | 5/1974 | Farque | 180/167 |
| 4,026,376 | 5/1977 | Gee | 180/167 X |
| 4,088,939 | 5/1978 | Mitschke et al. | 180/168 X |
| 4,193,713 | 3/1980 | Van Nes | 405/159 |

FOREIGN PATENT DOCUMENTS

| | | | |
|---|---|---|---|
| 1256096 | 12/1967 | Fed. Rep. of Germany | 180/7 A |
| 2639577 | 3/1977 | Fed. Rep. of Germany | 405/172 |
| 2007598 | 5/1979 | United Kingdom | 405/157 |

Primary Examiner—Dennis L. Taylor

[57] ABSTRACT

Method and installation for depositing materials on an ocean bed in accordance with a given line in which the autonomous vehicle is displaced on the ocean bed by accurately following said line, whereby the vehicle is provided with a hopper, a ship is moved on the surface of the ocean roughly in accordance with said line, the materials are discharged from this ship towards the hopper and are guided by means of a pipe suspended beneath the ship and whose lower end is not integral with the hopper, wherein the propulsion means of the pipe disposed at the lower end thereof are operated so that the lower end of the pipe is forced to remain above the hopper.

10 Claims, 10 Drawing Figures

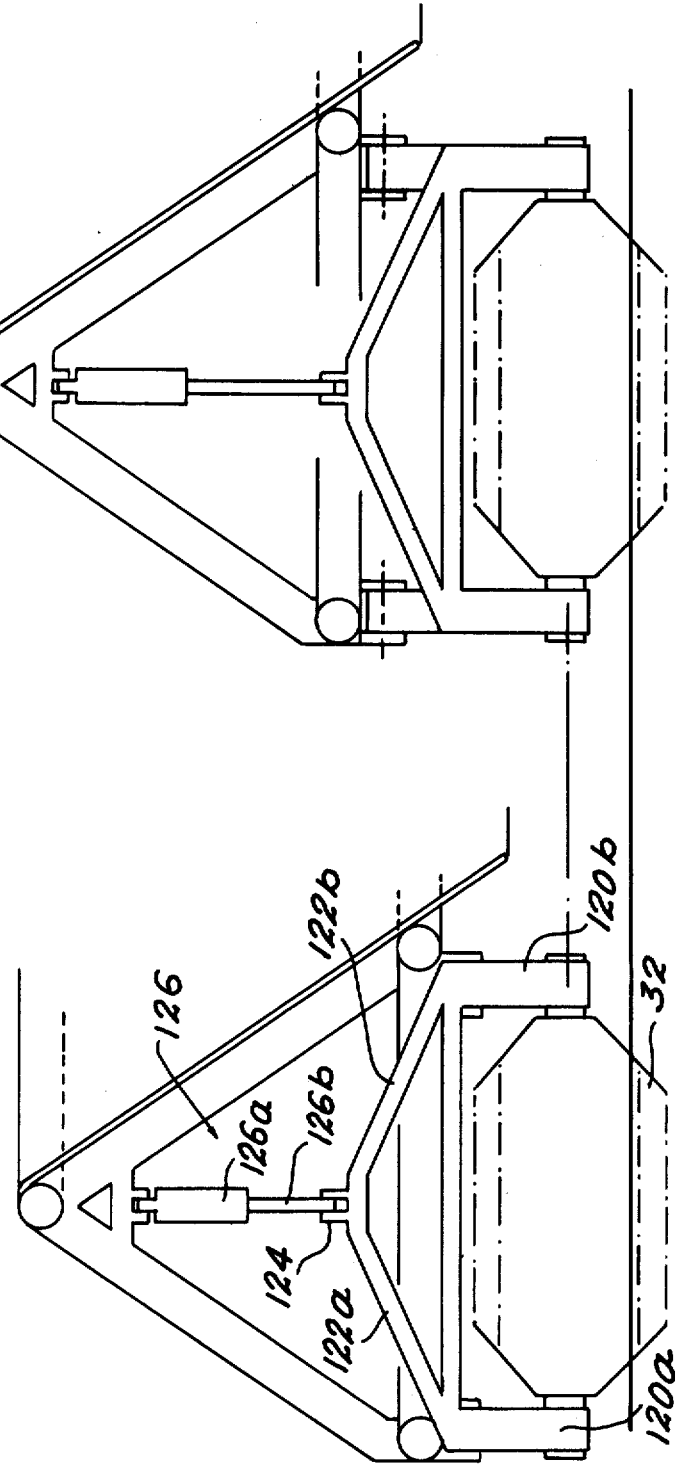

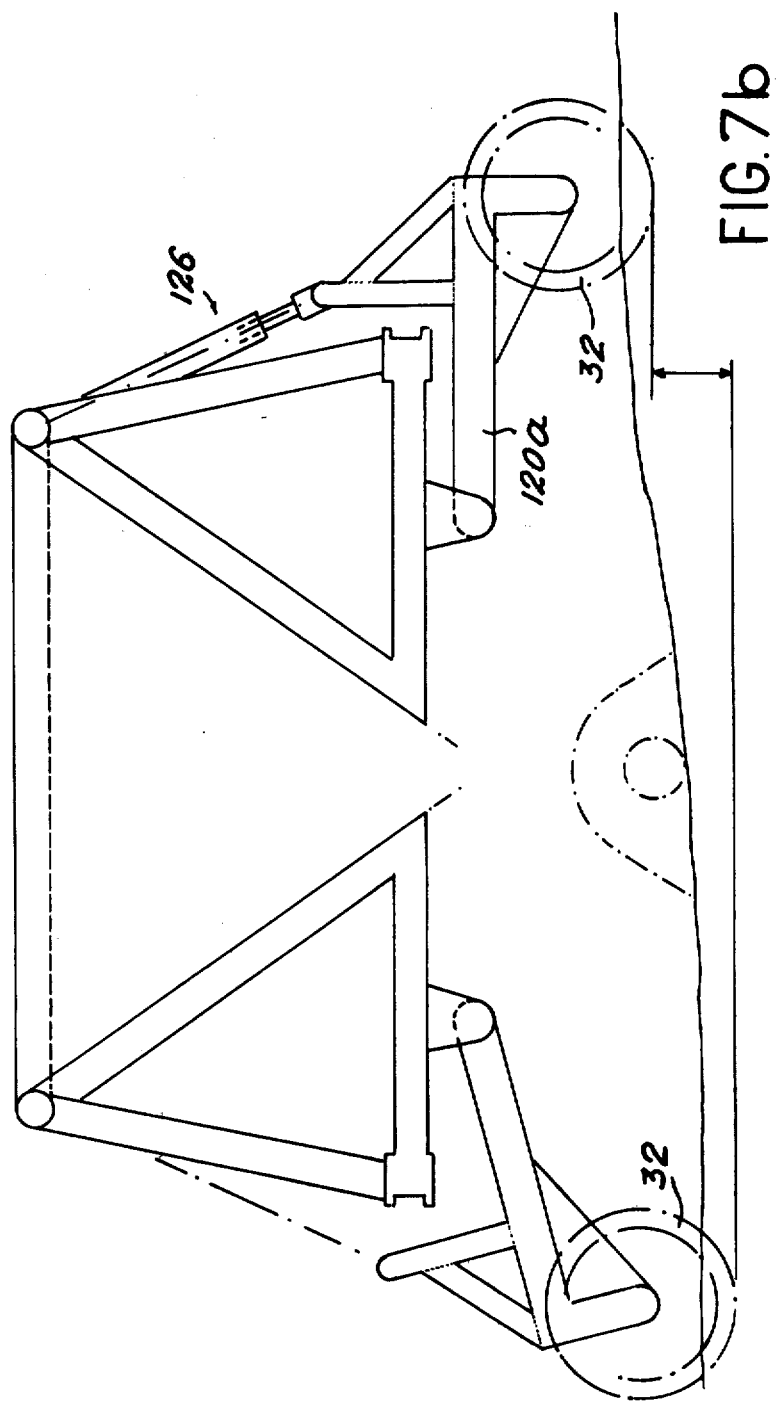

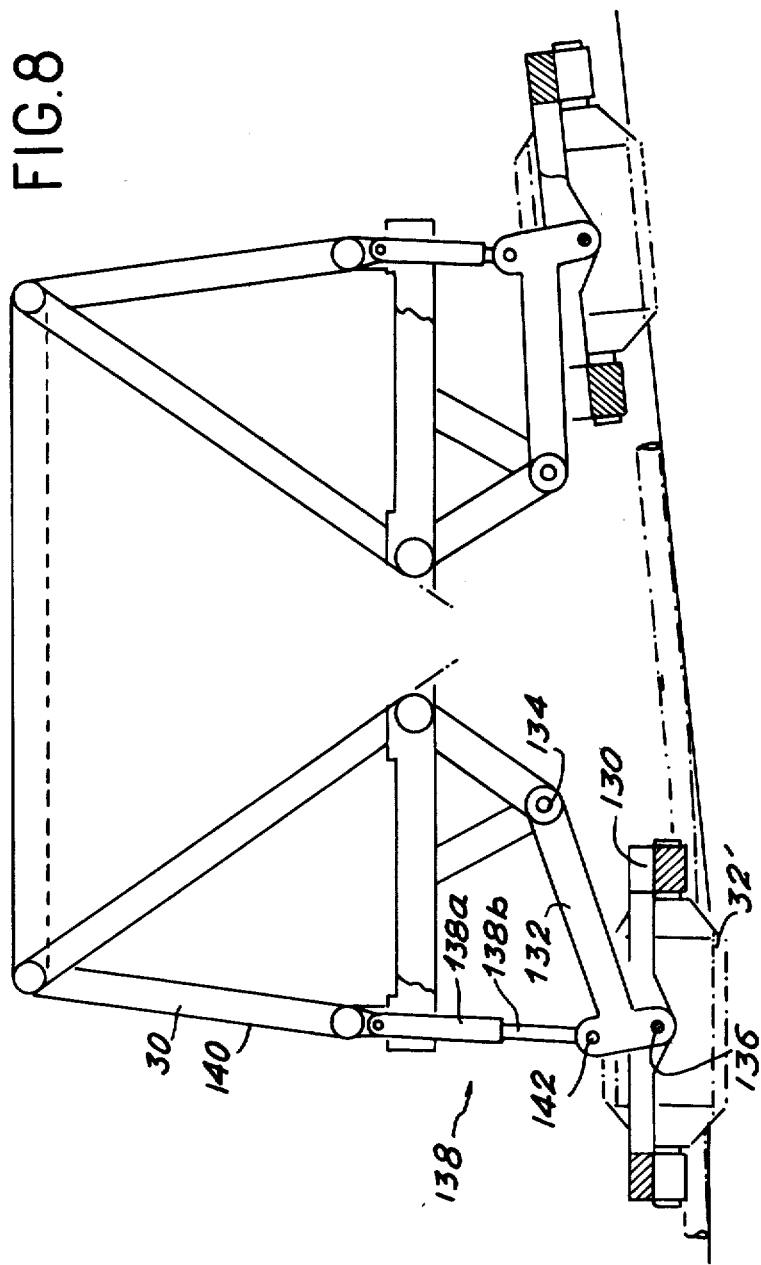

METHOD FOR DEPOSITING MATERIAL ON THE OCEAN BED AND APPARATUS FOR PERFORMING THE SAME

This is a division of application Ser. No. 971,193, filed Dec. 20, 1978.

BACKGROUND OF THE INVENTION

The present invention relates to a method for depositing materials on the sea bed in accordance with a given layout configuration and to apparatus for performing the said method.

More specifically, the present invention relates to a method for depositing materials such as gravel or rocks on a pipeline placed on the sea bed, whereby said pipeline can for example be a gas or oil pipeline, a cable, etc.

As is known, problems are caused by the existence of cables or pipes on the sea bed. In addition to the necessity to immobilise them, they must be protected so that they will not be accidentally damaged by trawls or anchors of ships or any other object dragged along the sea bed. Conversely, to prevent damage to fishing tackle, such as trawls, these cables or pipes must not be left in an exposed an unsecured manner on the sea bed. Therefore, said cables or pipes have to be buried, which involves the digging out of a trench in the sediment on the sea bed in order to place the cables or pipes therein, whereby when the sea bed is rocky, the trenches have to be made in this rock, at least in the case of cables. When the sediment of the sea bed has a limited cohesion, the trench is generally made by using jets of water. The cable or pipe is then covered naturally by sediment.

When the sea bed is hard and there is no possibility of digging out a trench or for traversing basins on the bottom of the ocean, the aforementioned methods cannot be used. In addition, ocean currents can lead to the exposure of buried cables or pipes, making it necessary to place protective materials thereon.

When the deposits have to be made up to depths of 100 meters, such materials are discharged from the surface. If it is desired to cover the complete tube which can in particular be a large pipeline, it is necessary to deposit a minimum thickness of about 1 meter thereon and due to the spreading out of the material from its drop point it is necessary to use 20 to 100 times more material than would be necessary if deposition was very accurate.

Installations for depositing rocks on a pipeline resting on the sea bed are also known in which there is a surface ship, an autonomous vehicle which is mechanically obliged to follow the line of the pipeline and a discharge pipe suspended on the ship. The vehicle carries a hopper and a ring integral with the hopper mechanically forces the lower end of the pipe to remain above the hopper. With such a system, it is obvious that all the forces applied to the pipe and in particular to its free lowe end are integrally transmitted to the vehicle, due to the fact that there is a mechanical connection between vehicle and pipe, with no real possibility of absorbing these forces other than by the vehicle. The forces are essentially due to the inertia of the ship and/or the pipe, either as a result of the effect of the swell or due to position changes to the pipe. Moreover, the vertical amplitude of pounding makes it necessary to position the ring sufficiently high above the vehicle hopper. It is clear that unless the height of the pipe is reduced (for example to below 50 m) the forces applied by the pipe to the vehicle are very considerable with such a system, even if the pipe moves very slowly. To maintain the vertical stability of the vehicle, it is then necessary for the latter to have a very large and very heavy impaling system. This will render its construction more complex and costly. In addition, the autonomous propulsions means must be much more powerful and their bearing surfaces much larger, which increases with weight. Thus, the forces applied by the lower end of the pipe to the vehicle may make it possible in practice to obtain a good stability of said vehicle. However, even if the vehicle is made sufficiently stable to prevent it tipping over through providing a large impaling system, said forces are liable to displace the vehicle from its trajectory.

It is also known that it is possible to control the position of a ship by so-called dynamic positioning. This makes it possible to obtain an extremely accurate positioning of the ship leading to a positioning relative to the sea bed with an accuracy of at the best approximately 1% of the depth. Thus, to solve the problem of depositing rocks on a pipeline by means of a self-propelled vehicle, said dynamic positioning of a ship can only be used for limited depths, which must certainly be below 100 meters.

BRIEF SUMMARY OF THE INVENTION

The object of the present invention is to make possible the deposition of material such as rocks along a given line corresponding to the cable or pipeline, even when the sea bed on which the cable or pipeline is resting is relatively deep, for example in excess of 100 meters.

To achieve this object, the method essentially comprises moving on the sea bed an autonomous vehicle carrying a hopper, said vehicle being forced to strictly follow the line of the pipeline to be covered. In addition, a ship with dynamic positioning is used. Moreover, a pipe is suspended which serves to carry the materials to be discharged, said pipe having displacement means at its lower end on which it is possible to act and the said lower end is made to remain above the hopper by means of displacement devices. The assembly of said members moves progressively to follow the line of the pipeline.

The importance and originality of the invention is clearly apparent compared with the prior art. Due to the control by displacement means on the lower end of the pipe, two main advantages are obtained, particularly when said means are fixed to the lower end of said pipe. Firstly, there is no mechanical contact between the lower end of the pipe and the vehicle, the control system preventing the transmission of forces to the vehicle. As has been stated hereinbefore, this is very important, particularly when the sea bed is at a considerable depth. Secondly, this control system makes it possible to significantly increase possibilities of fluctuation in position of the ship relative to the vehicle hopper as compared with the prior art system. This leads to a much greater flexibility in the way in which the surface vessel follows the course of the vehicle.

According to the method of the invention, and although the position of the surface vessel is not defined with a great precision compared with the pipeline, the discharge of the material takes place with extremely great accuracy due to the increasingly precise cascade positioning. This cascade comprises on the one hand the positioning of the lower end of the discharging pipe with respect to the hopper and on the other hand the great positioning accuracy of the hopper with respect to the pipeline to be covered. These two precision characteristics are made compatible due to the hopper inlet cross-section.

The present invention also has for its object an installation for performing the method described hereinbefore of the type comprising a ship equipped with a pipe directed towards the sea bed onto which the material is to be discharged, said pipe serving to guide the material used for making the covering, and an autonomous vehicle which is able to travel on the sea bed and which has its own means for the movement thereof on the sea bed, control means for making the vehicle follow the deposition line to be made and a hopper which is able to receive the materials discharge by the pipe, said installation being characterised in that the pipe has means for detecting the position of the lower end relative to the hopper and the autonomous displacement means disposed at the lower end of the pipe which makes said end remain above the hopper, as a function of information from the detection means.

The present invention also relates to an apparatus or vehicle for performing this method, whereby said vehicle essentially comprises at least two propulsion means, for example in the form of Archimedes' screws, which bear on the sea bed and which are controlled by means of a system of transducers linked with said vehicle in such a way that they accurately follow the pipeline to be covered and carry a hopper for the materials and a second system of transducers which are able to receive or transmit positioning signals coming from or travelling towards a second movable member located above the vehicle.

BRIEF DESCRIPTION OF THE DRAWINGS

The invention will be better understood from the following description of preferred, non-limitative embodiments, with reference to the attached drawings, wherein show:

FIGS. 7a and 7b views of the vehicle from the front and side showing a second mechanism for raising the vehicle chassis with respect to the propulsion means.

FIG. 8 a side view of the vehicle showing a third mechanism for raising the chassis relative to the propulsion means.

DETAILED DESCRIPTION OF THE PREFERRED EMBODIMENTS

Figure 1:
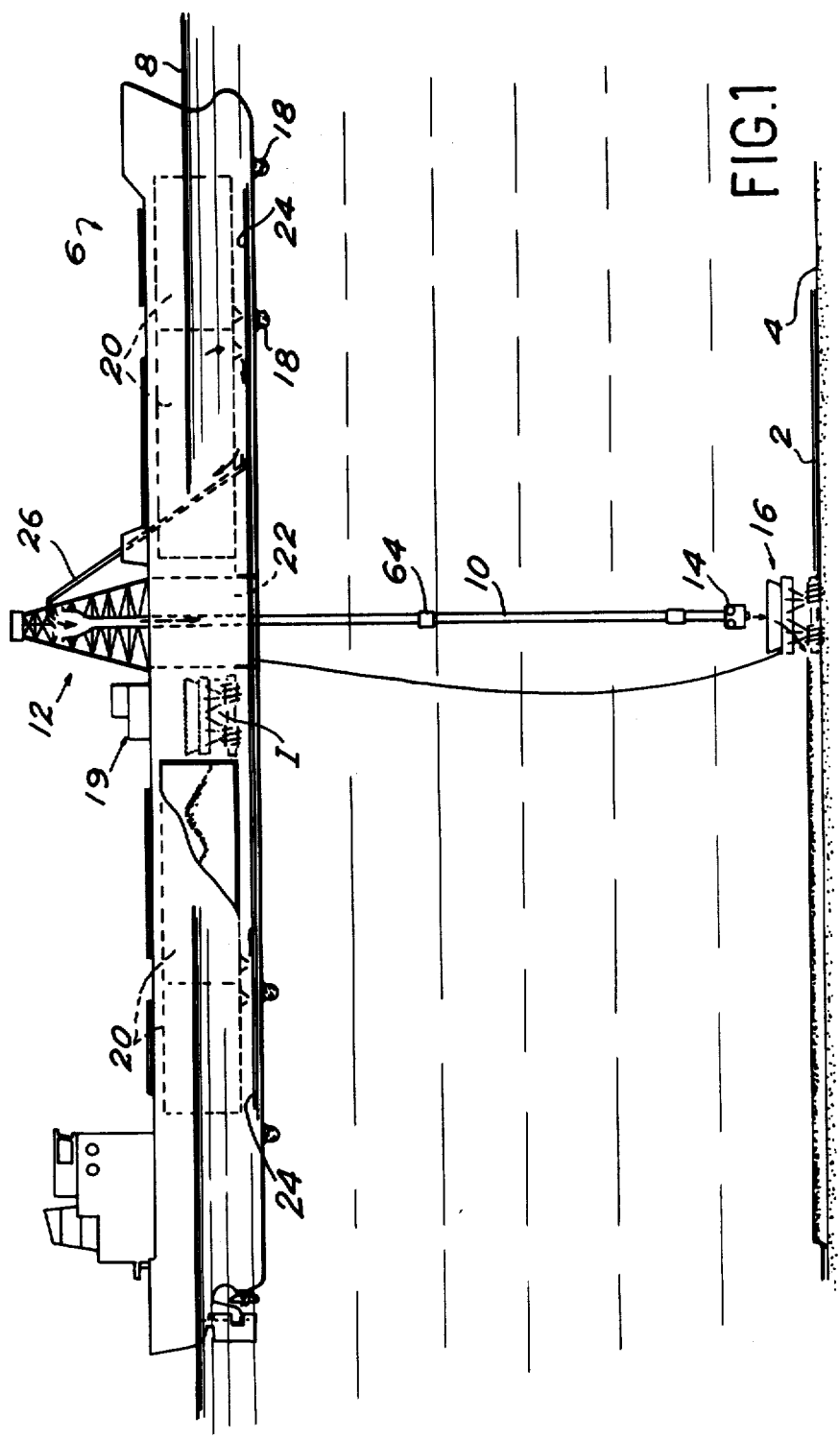
FIG. 1 an elevation of the installation according to the invention.

FIG. 1 shows the complete installation for burying a pipeline 2 resting on the sea bed 4 operating from a surface ship indicated by line 8. The installation comprises on the one hand the members directly connected to ship 6 and on the other members which, during the normal operation of the installation, move on the sea bed.

The first members essentially comprise a material supply pipe 10 suspended on a derrick 12 linked to ship 6. This pipe 10 terminates in the vicinity of the sea bed by a head 14, which may be propulsive and will be described hereinafter. The other part of the installation which is not connected to the ship essentially comprises a vehicle 16 which moves via propulsion means on sea bed 4 and which, as will be explained hereinafter, is obliged to follow the line of pipeline 2. As has already been stated, a dynamic positioning of the ship is obtained by its own equipment, for example constituted by screw propellers 18. There is a second positioning of head 14 of pipe 10 relative to vehicle 16 and a third positioning of vehicle 16 relative to pipeline 2. In addition to the main components described hereinbefore, it is obvious that ship 6 has a rock loading control room 19 relative to the loading equipment and holds such as 20 for storing the rocks to be spread over pipeline 2. A central shaft 22 is positioned below derrick 12 and this permits not only the passage of pipe 10 when in operation, but also the raising of the complete vehicle 16 and which is indicated on board the ship by reference letter I.

It is clear that the suspension of pipe 10 on the derrick makes it possible to compensate the variations in depth of the sea bed in order to maintain the lower end of the pipe at a limited distance above the vehicle, as well as to compensate pounding.

The ship also has a conveyor 24 for conveying rocks or in more general terms the loading materials up to a carpet loader 26 arriving at the upper end of the derrick, i.e. the upper end of pipe 10.

Various embodiments of vehicle 16 and the positioning controls of said vehicles with respect to the pipeline 2 to be buried and head 14 of pipe 10 with respect to said vehicle will now be described.

Figure 2:
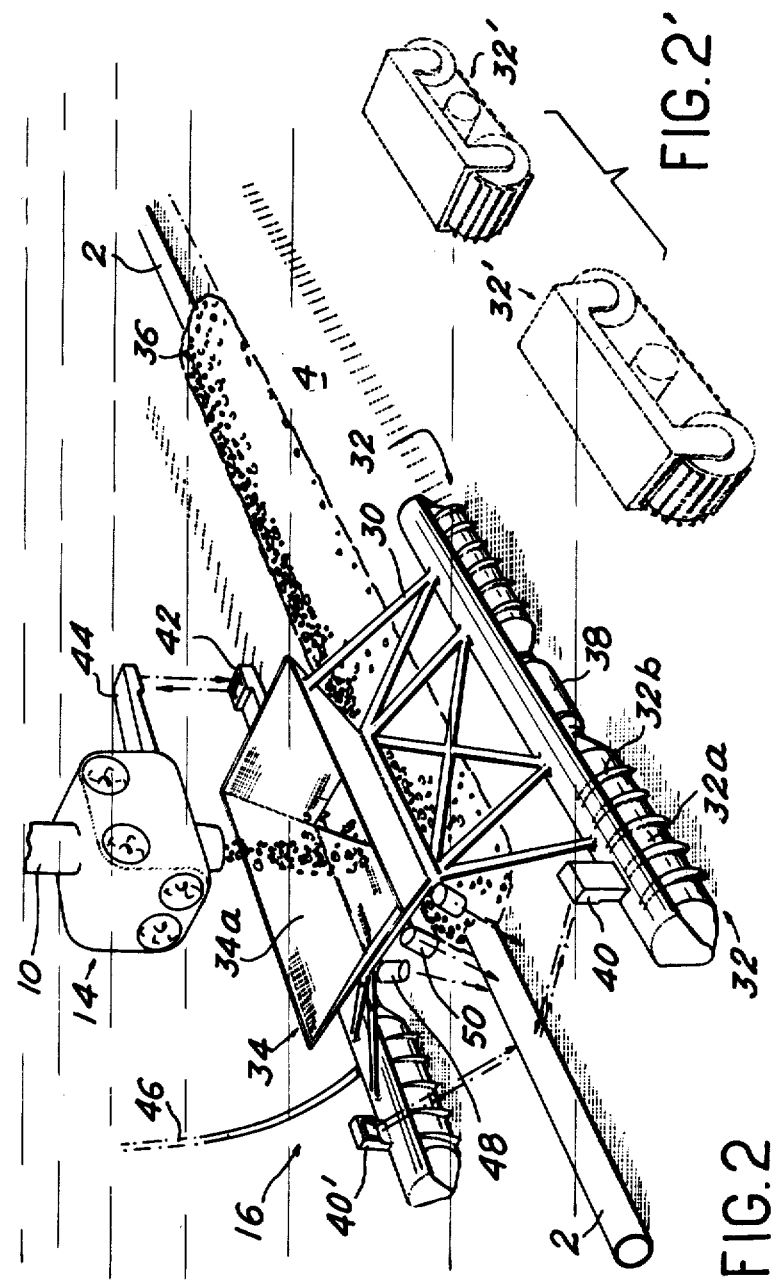
FIG. 2 is a perspective view showing an embodiment of the depositing vehicle and the end of the material discharge pipe.

Vehicle 16 comprises a chassis 30 made from welded metal sections which form the vehicle frame and connect between them Archimedes' screws such as 32 (4 in the case of FIG. 2) which constitute the propulsion means of vehicle 16 to a hopper 34 for the reception and depositing of materials (rocks) which are to form a covering 36 on pipeline 2. The cylindrical part 32a of each Archimedes' screw permits bearing on the sea bed and participates in the weight compensation of the vehicle assembly. The helical parts 32 of the Archimedes' screws having opposite pitches permit the displacement and in one or other direction by the composition of rotational movements. If the movements are of the same speed and in opposite directions, the vehicle moves longitudinally in a straight line. If their movements are of different speeds and in opposite directions, the vehicle turns and finally if their movements are of the same speed and the same directions, the vehicle moves transversely. Each of the Archimedes' screws is driven by a reduction motor or motor unit 38, which may form an integral part of the propulsion means within for example the Archimedes' screws. As shown in FIg. 2', the Archimedes' screws constituting the propulsion means may be replaced by conventional caterpillars 32'.

Hopper 34 is made from panels 34a, which may be interchangeable and must be shock-resistant and abrasive-proof. The rear wall may have a remotely controllable gate making it possible to discharge the rocks in case of a blockage in the hopper. Due to the hopper being shaped like an inverted frustum of a pyramid, it is able to accept relative positional errors between the lower end of pipe 10 and the point of depositing the material on the sea bed. In addition to the propulsion means and the hopper, vehicle 16 has a first system of transducers ensuring the centering of the vehicle 16 relative to pipeline 2.

FIG. 2 shows transducers 40 and 40', which are for example simple or differential ultrasonic transducers. This system may be supplemented by mechanical transducers or sensors or electromagnetic or optical transducers. It is clear that these transducers behave both as transmitters and receivers and that if the outward and returned times of the signals transmitted by the transducers 40 and 40' are the same the vehicle is correctly centered.

A second system of transducers ensures the positioning of head 14 of pipe 10 relative to vehicle 16 or more precisely relative to hopper 34 of vehicle 16. As an example, in FIG. 2 hopper 34 is equipped with a transducer 42 and head 14 of pipe 10 is equipped with a pair of transducers 44. For example, transducer 44 is an ultrasonic transmitter-receiver and transducer 42 is a reflector. Obviously, the centering of the head relative to vehicle 16 is correct if the transit time of the two ultrasonic signals between the transmitter and the receiver are the same. As will be shown hereinafter head 14 is itself equipped with propulsion means, which are started up by an error signal picked up by transducer 44. This arrangement makes it possible to bring about a positioning of the lower end of pipe 10 above the intake face of hopper 34. It is pointed out that a cable 46 connects the surface vessel 10 to vehicle 16. It comprises the power cables necessary for motor 38, measurement and information transmission cables, control cables, optical data transmission cables and compressed air supply tubes for an optional ballasting of the vehicle. Moreover, vehicle 16 preferably has light projection equipment 48 and electronic cameras 50. These projectors and cameras essentially have the function of facilitating the initial positioning of vehicle 16 before the automatic control sequence. A plurality of not shown mechanical sensors make it possible to ensure the quality of the deposit 36 made and to transmit the necessary data for metering the quantity of rocks carried by pipe 10.

It is apparent that it is advantageous to have a hopper with a relatively large opening in order to permit a certain displacement of the end of the pipe relative to the vehicle without losing the accuracy of depositing, as a function of the precision of the controls. As an example, it is pointed out that the diameter of pipe 10 is approximately 600 to 1200 mm and that the opening of the hopper (which has a substantially square cross-section) is at least 8 meters. This ensures that the lower end of the pipe remains above the hopper.

Figure 3:
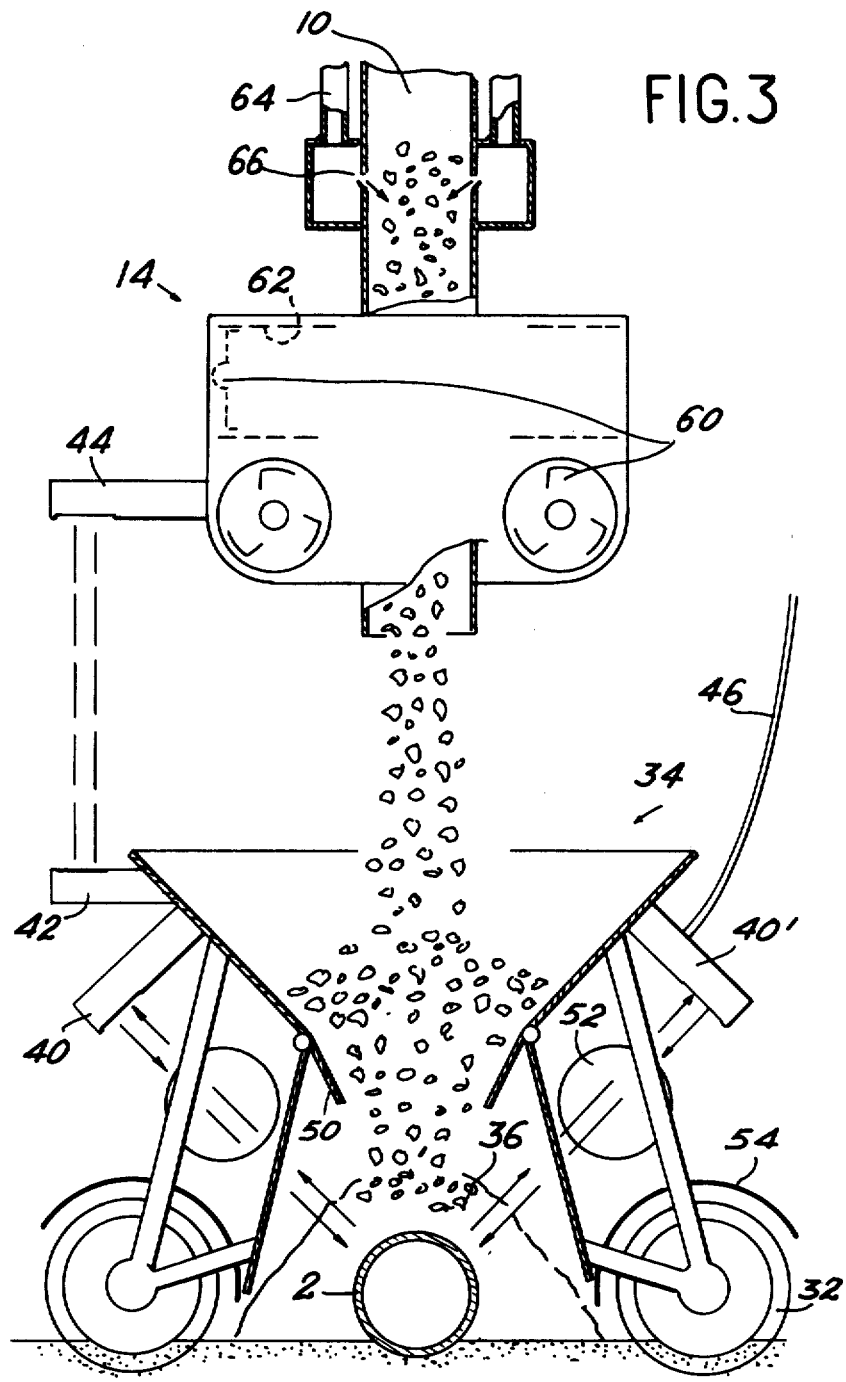
FIG. 3 an elevation of the apparatus of FIG. 2 showing the various controls in greater detail.

FIG. 3 makes it possible to complete the description of the first embodiment. Flaps 50 located at the lower end of hopper 34 and controlled by not shown jacks make it possible to vary the deposition width by regulating the inclination of said flaps. Moreover, by noting solely on one of the flaps, it is possible to compensate small errors in the positioning of the vehicle relative to pipeline 2. A plurality of ballasting members 32 fixed to chassis 30 make it possible to vary the apparent specific gravity of the vehicle and consequently to regulate its bearing force on the ground as a function of the characteristics thereof. Vehicle 6 is equipped with protective devices 54 which protect the Archimedes' screws 32 against the accidental dropping of rocks from hopper 34.

FIG. 3 also shows transducers 40, 40' permitting the positioning of vehicle 16 relative to the pipeline 2 to be buried, as well as transducers 40, 44 which permit the control of the position of head 14 of the pipe relative to hopper 34. FIG. 3 shows the propulsion means of head 14 in greater detail. The propulsion means of head 14 is for example constituted by screw propellers such as 60 disposed in nozzles 62. The nozzles are arranged in two orthogonal and horizontal directions in such a way that head 14 can move autonomously in a horizontal plane. Obviously, these screw propellors are rotated as a functon of information supplied by transducer 44. Finally, to slow down the flow of rocks in pipe 10, the latter may be equipped with tubes 64 and openings 66 for the injection of a pressurized gas which lightens the column of water and rocks. It is important to note that due to the symmetry between the front and rear of the vehicle and due to the fact that the guidance thereof relative to the pipeline is realised without mechanical contact, the vehicle can return "on its paces", i.e. can move backwards returning over part of the pipeline on which rocks have already been spread.

Figure 4:
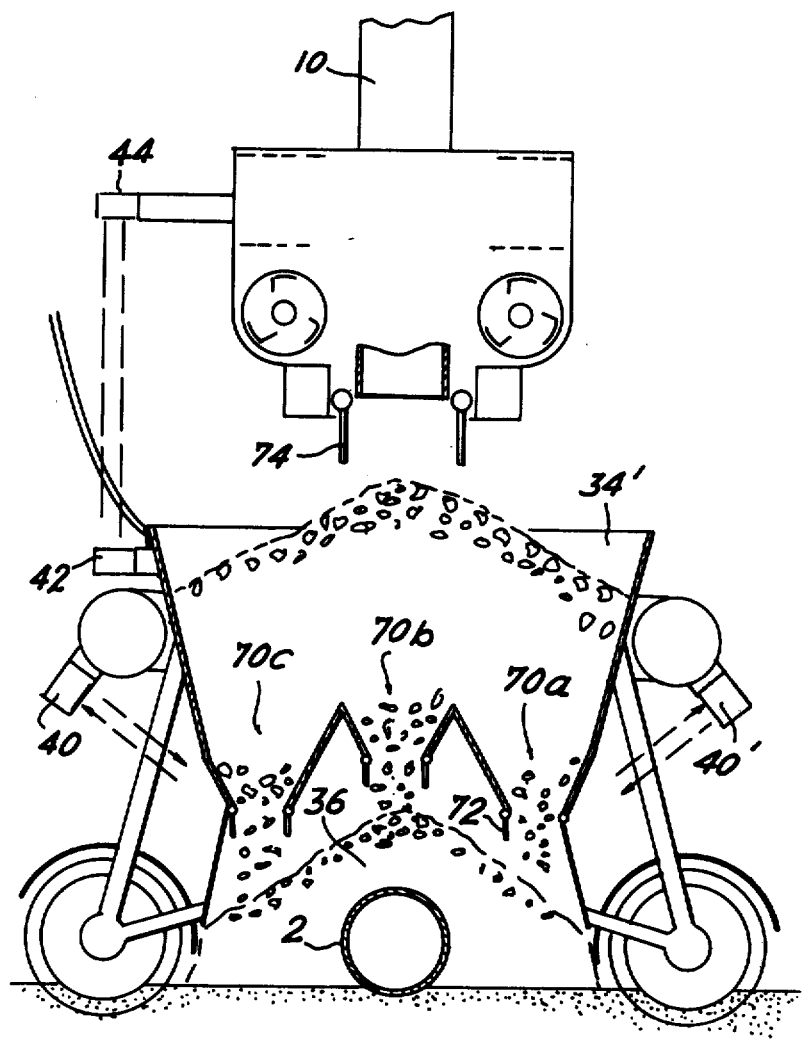
FIG. 4 an elevation of the constructional variant of the vehicle of FIG. 3 with a different type of hopper.

FIG. 4 shows a constructional variant of FIG. 3, the essential difference being in the shape of the hopper 34'. The latter has at its lower end a plurality of openings 70a, 70b, 70c permitting the most appropriate distribution of the rocks, said openings being provided with flaps 72 making it possible to completely stop the deposition of rocks. The rock supply pipe 10 may have at its lower end a stop valve 74, which makes it possible to stop the supply of rocks to the hopper.

Figure 5:
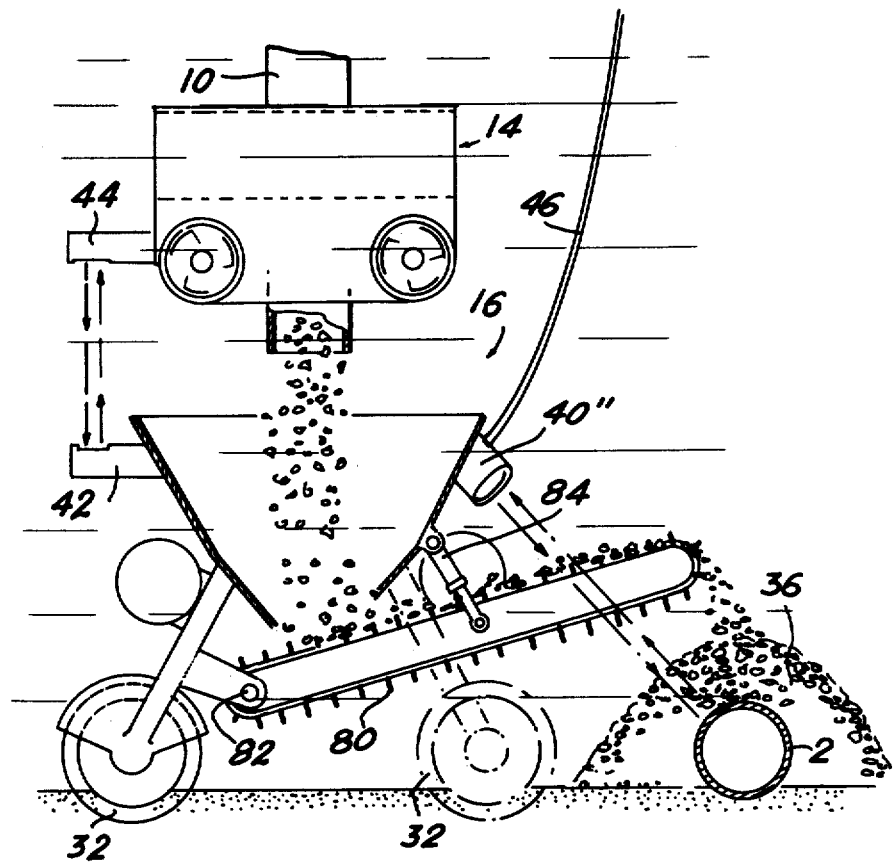
FIG. 5 an elevation of a further embodiment of the vehicle in which the material is deposited laterally.

FIG. 5 shows a further embodiment of vehicle 16 in which case the rocks contained in the hopper do not fall directly onto the ground flush with the hopper and instead drop onto a carpet loader 80. This loader makes it possible to transport the rocks from below hopper 34 to the point of depositing said rocks on pipeline 2. Obviously, in this case the propulsion means of the vehicle are not disposed on either side of pipeline 2, but on one side thereof. To control the displacement of the vehicle, one or more positioning transducers 40" are used, which are directed towards the outside of the vehicle. It is pointed out that loader 80 is articulated about the spindle 82 with respect to the vehicle chassis and that its inclination can be varied by controlling jack 84 to regulate the height of fall of the rocks. The other features of the vehicle are identical to those described with regard to FIGS. 2 to 4.

This variant may be advantageous for placing the vehicle in its initial material unloading position, because in this way the vehicle can approach pipeline 2 from the side without having to bestride it. However, the position regulation is possibly more difficult. In the foregoing description, it has been assumed that the propulsion means and vehicle chassis are linked. However, it is readily apparent that it may be advantageous to permit an upward or downward movement of the chassis relative to the propulsion means. This makes it possible to adapt the size of the bottom of the hopper relative to the diameter of the pipeline to be covered and also to compensate to a certain extent unevennesses of the ground. Hereinafter, three embodiments of mechanisms permitting this regulation will be described.

Figure 6:
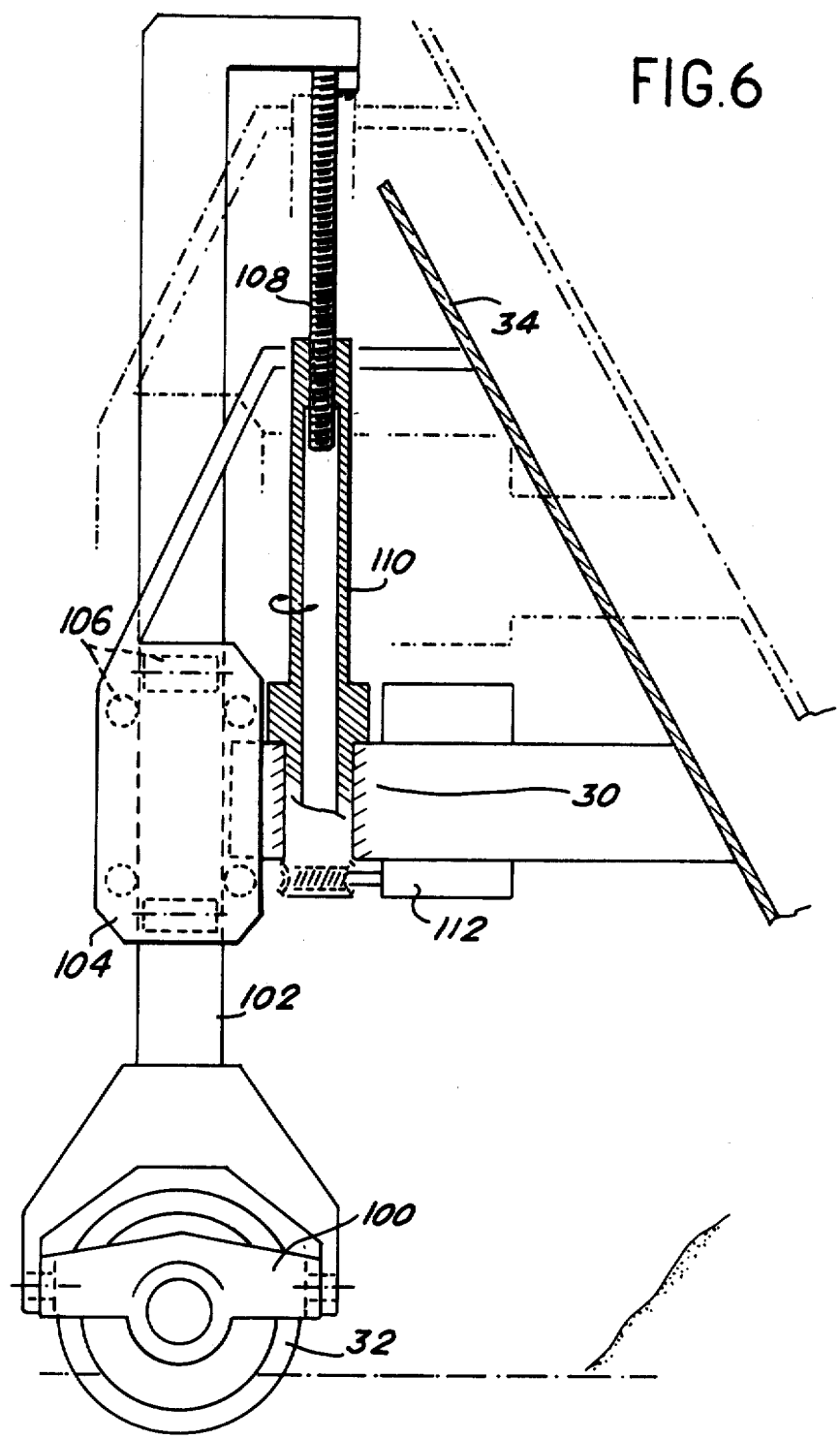
FIG. 6 a part view of the vehicle showing a first embodiment permitting the raising of the vehicle chassis with respect to the propulsion means.

In FIG. 6, each propulsion eans 32 is fixed by an articulated system 100 to the lower end of a post 102 which is made to slide vertically within guides 104 fixed to the chassis 30 of the vehicle. these guides 104 are for example equipped with rollers 106. The upper end of post 102 is fixed to a threaded rod 108 which is able to move in vertical translation under the effect of the rotation of the internally threaded sleeve 110 immobilised in translation with respect to chassis 30. A motor 112, which is also fixed to the chassis, rotates sleeve 110 and thus brings about the sliding of post 102. Obviously, an identical mechanism is provided for each propulsion means.

FIGS. 7a and 7b show a second embodiment of the mechanism. Each propulsion means 32 may be raised or lowered by a linkage which pivots about an axis parallel to the direction of advance of the vehicle. Each end of a propulsion means 32 is pivoted at one end of a lever arm 120, 120b, whose other end is articulated relative to chassis 30. Bars 122a, 122b connect these two arms at an articulation point 124. A jack 126 controls the rise and fall of arms 120 and consequently of the propulsion means. Body 126a is articulated relative to an upper member of the chassis and rod 126b of the jack is articulated at articulation point 124. It is clear that by controlling jack 126 the position of propulsion means 32 is also controlled. Obviously, the vehicle has four identical mechanisms and that in the half view of the left of FIG. 7a the chassis is in the lower position and on the half view from the right it is in the upper position.

FIG. 8 shows a third embodiment in which the raising or lowering of the chassis relative to the propulsion means is brought about by pivoting about an axis perpendicular to the direction of advance of the vehicle. In this embodiment, preferably each propulsion system is constituted by two propulsion means with parallel spindles forming a bogie.

In FIG. 8, each pair of propulsion means (only one 32' being shown) is supported by an assembly 130 forming a support member. The raising mechanism comprises a lever arm 132 which is articulated relative to chassis 30 about spindle 134 and about spindle 136 relative to structure 130. The displacement control is provided by jack 148. Body 138a of the jack is articulated on a post 140 of chassis 30 and rod 138b on spindle 142. Thus, there is at least one degree of freedom between the actuating mechanism and the pair of propulsion means, which permits the propulsion means to adapt to the configuration of the oceanbed.

It should be noted that in each of the three embodiments the four motive members (112, 126, 136) may be controlled simultaneously. This leads to an overall raising or lowering movement of the chassis. It is impossible to individually control each motive member, thus bringing about a certain compensation for the gradient of the ocean bed.

Figure 9:
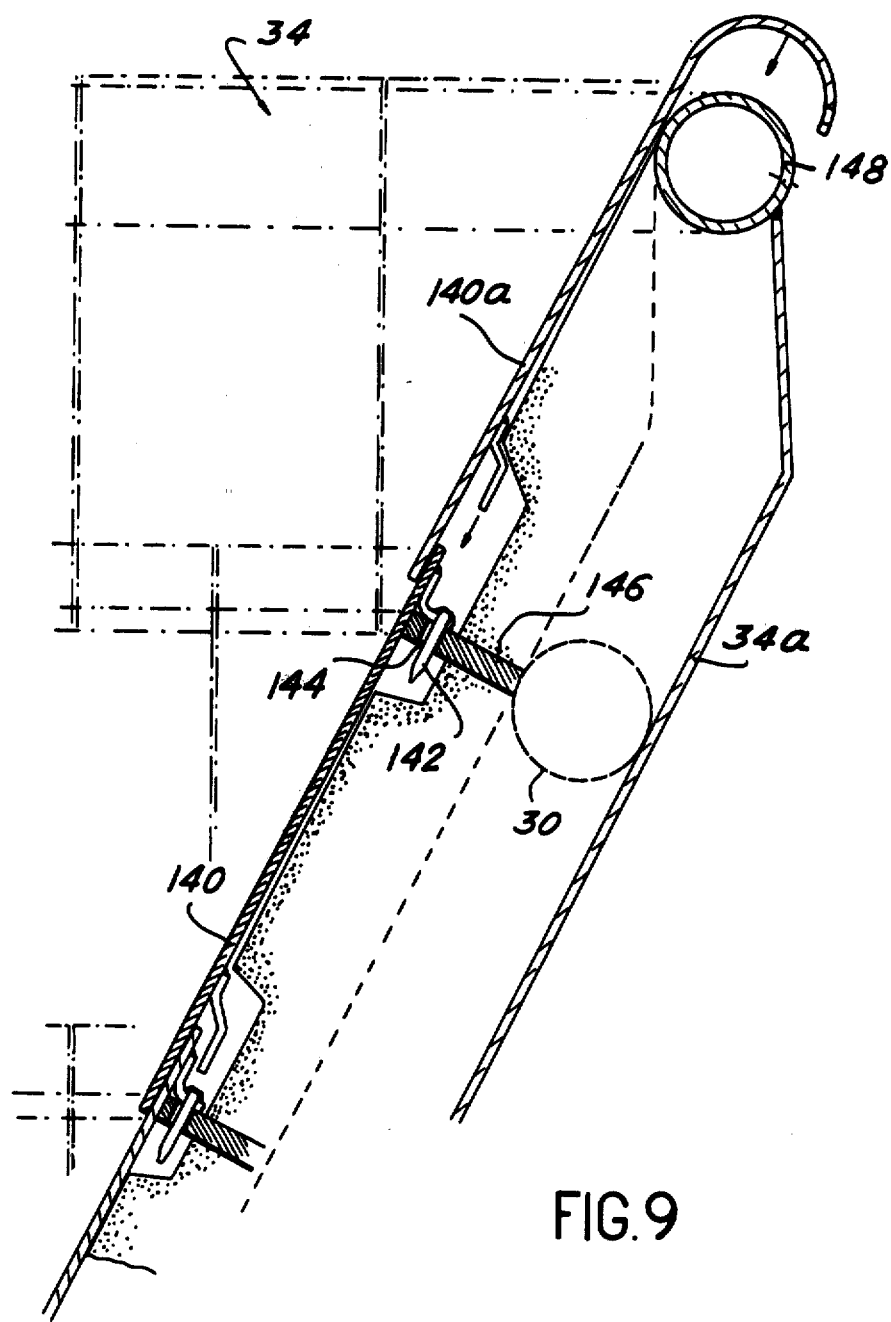
FIG. 9 a part sectional view of a wall of the hopper showing a covering of the hopper.

FIG. 9 shows in greater detail, an embodiment of the hopper walls. Each wall 34a is covered by a system of parts in the manner of tiles on a roof. Each part 140 has a generally rectangular shape and is fixed in its upper portion by pins 142 inserted in corresponding bores 144 provided in supporting members 146 fixed to chassis 30. Parts 140 cover one another. The upper parts 140a are for example directly fixed to the upper edge 148 of the hopper.

It is obvious that after being in use for a certain time the hopper walls are damaged by falling rocks or gravel falling through pipe 10. Due to this system of tiles, it is merely necessary to replace the parts 140 to once again have a completely satisfactory hopper.

The main advantages of the invention and method described hereinbefore are readily apparent. It makes it possible to mechanically disengage the vehicle with respect to the ocean bed and it follows with the desired accuracy the line of the deposition of material to be carried out, whilst a dynamic positioning makes it possible to maintain ship 6 substantially vertically above the depositing vehicle in the case of a depth equal to or above 100 m (e.g. between 100 and 300 m). Whilst consuming only a limited amount of power, the propulsion means of the pipe 10 can be positioned above the hopper with an accuracy greater than that of the ship and this leads to the final depositing accuracy. It should be noted that to cover with rocks an oil pipeline with a diameter of 1 meter to a thickness of about 1 meter a variation of 10 cm in the deposition axis leads to the doubling of the volume of rocks necessary to guarantee the minimum thickness. The invention leads to considerable economics in this connection.

The invention is not limited to the embodiments described and represented hereinbefore and various modifications can be made thereto without passing beyond the scope of the invention.

What is claimed is:

1. A vehicle for depositing materials on a pipeline placed on a sea bed, comprising: a rigid chassis to which are fixed a hopper which has an upper opening and a lower opening, at least one pair of propulsion means, each being disposed on one side of the lower opening of the hopper, motive means able to drive the propulsion means, and first detection means able to detect without contact the position variation between the vehicle and the pipeline and to control said motive means for cancelling out said variation.

2. A vehicle according to claim 1, wherein it comprises carpet loader means fixed to the chassis and able to move the materials received by the hopper from a position located below the lower opening of the hopper to a position which is lateral with respect to the main axis of the vehicle and wherein the detection means are able to maintain the lateral position above the given line.

3. A vehicle according to claim 1, wherein the propulsion means are Archimedes' screws.

4. A vehicle according to claim 1, wherein the vehicle has four propulsion means and the connection between the chassis of the vehicle and each propulsion means is constituted by a mechanical transmission system and motor actuating means for said transmission system in order to vary the vertical distance between the chassis and each of the propulsion means.

5. A vehicle according to claim 4, wherein the mechanical transmission system comprises a post, whose lower end is integral with the propulsion means and whose upper end is integral with means for displacing in the vertical direction and means for guidance in translation of the post integral with the vehicle chassis.

6. A vehicle according to claim 4, wherein the mechanical transmission system comprises a lever arm, whose one end is fixed to a propulsion means and whose other end is articulated relative to the vehicle chassis about a spindle parallel to the vehicle displacement direction and wherein the motive means comprise a jack articulated to both the chassis and to the arm.

7. A vehicle according to claim 4, wherein the mechanical transmission system comprises a lever arm, whose one end is fixed to a propulsion means and whose other end is articulated relative to the vehicle chassis about a spindle orthogonal to the vehicle displacement direction and wherein the motive means comprise a jack articulated both to the chassis and to the arm.

8. A vehicle according to claim 1, wherein each of the walls of the hopper is covered by protective elements which are attached by their upper edge to the hopper structure, said elements partly mutually overlapping one another in the manner of the tiles of a roof.

9. A vehicle as claimed in claim 1, wherein second detection means are fixed to the rigid chassis, said second detection means being able to receive or to emit positioning signals coming from or going to a second movable element located above said vehicle.

10. A vehicle as claimed in claim 1 or 9, wherein said first detection means comprise ultrasonic transducers.

* * * * *